(12) United States Patent
Gonzaga

(10) Patent No.: US 7,306,023 B2
(45) Date of Patent: Dec. 11, 2007

(54) TOOL PROTECTION DEVICE IN A TIRE ASSEMBLING-DISASSEMBLING MACHINE

(75) Inventor: Tullio Gonzaga, Correggio (IT)

(73) Assignee: Butler Engineering & Marketing S.p.A., Rio Saliceto (IT)

( * ) Notice: Subject to any disclaimer, the term of this patent is extended or adjusted under 35 U.S.C. 154(b) by 169 days.

(21) Appl. No.: 11/127,495

(22) Filed: May 12, 2005

(65) Prior Publication Data

US 2006/0254724 A1    Nov. 16, 2006

(51) Int. Cl.
*B60C 25/132* (2006.01)
*B60C 25/00* (2006.01)

(52) U.S. Cl. ...................... 157/1.17; 157/1.24

(58) Field of Classification Search ............... 157/1.17, 157/1.24

See application file for complete search history.

(56) References Cited

U.S. PATENT DOCUMENTS

| | | | |
|---|---|---|---|
| 3,851,694 A * | 12/1974 | Brosene, Jr. ................... 157/1 |
| 4,417,614 A | 11/1983 | Cunningham et al. |
| 4,529,024 A * | 7/1985 | Vijay .......................... 157/1.24 |
| 5,941,294 A | 8/1999 | Cunningham et al. |
| 6,422,285 B1 * | 7/2002 | Gonzaga .................... 157/1.24 |
| 2004/0244918 A1 * | 12/2004 | Kliskey ........................ 157/1 |

FOREIGN PATENT DOCUMENTS

DE        4007006 A1        9/1990

\* cited by examiner

*Primary Examiner*—David B. Thomas
(74) *Attorney, Agent, or Firm*—Orum & Roth LLC

(57) ABSTRACT

A protection device for tool in a tire assembling-disassembling machine, which tool (2) has at least one working slot or groove (3) designed to slidingly engage, in use, with a peripheral edge of a wheel rim (C) located on the tire assembling-disassembling machine. The protection device comprises a laminar body (1) designed to be seated in the working groove (3), and retaining means (8a, 8b) between the laminar body (1) and the tool (2) provided removably to keep in position the laminar body (1) in the working groove (3).

9 Claims, 2 Drawing Sheets

TOOL PROTECTION DEVICE IN A TIRE ASSEMBLING-DISASSEMBLING MACHINE

BACKGROUND OF THE INVENTION

1. Field of the Invention

The present invention relates to a protection device for a tool in tire assembling-disassembling machine, particularly, but not exclusively, suitable for tools having a working slot or groove.

2. Description of Related Art

As it is known, assembling-disassembling of tire onto or from a wheel rim is carried out by fixing the wheel rim to a rotatable support of a tire assembling-disassembling machine and by making use of a tool that has a working slot or groove and is secured to the distal end of a suitable tool-carrying arm carried by a frame component of the tire assembling-disassembling machine. The tool is then slidingly inserted between the wheel rim edge and the tire bead edge. Thus, when the rotatable support is set in rotation, the wheel rim edge slidably engages with the tool working slot or groove, whereas a suitably shaped outer surface of the tool causes the tire bead edge to be transferred progressively from the inner to the outer side of the wheel rim edge or vice versa depending upon the direction of rotation of the rotatable support.

Tire assembling-disassembling tools are made either of a relatively hard metal alloy material or of a relatively soft synthetic material, preferably polyamide, e.g. Nylon®, either alone or reinforced with fibers, e.g. glass fibers, carbon fibers, or the like, in order to ensure a higher flexural-torsional stiffness to better withstand dynamic stress generated, in use, on the one hand, by forced sliding of the tire edge onto the tool outer surface and, on the other, owing to the tire peripheral edge sliding within the tool working slot or groove. Clearly, as the tire edge slides onto the tool outer surface, a resultant of forces is generated which is radially directed with respect to wheel rim, and causes a substantial rise in pressure and thus in friction between surface of the tool working groove or slot and peripheral edge of the wheel rim C set in rotation by the rotatable support of the tire assembling-disassembling machine.

Depending upon the type of wheel rim, i.e. made either of painted light alloy or of steel, friction between the peripheral edge of the wheel rim and the working slot or groove of the tool causes either wear of the tool or scratching of the wheel rim. As a matter of fact, should the wheel rim be made of painted light alloy, sliding of the relatively hard body of the tool onto a portion of the outer peripheral surface of the wheel rim can result in scratching or even damaging the wheel rim, whereas in the case of a steel wheel rim, unless the employed tool is highly resistant it can be rapidly worn off and thus permanently damaged. Should the tool employed in a tire assembling-disassembling operation be new, sliding of the working slot or groove onto the outer peripheral edge of the wheel rim of light alloy does not normally cause any damage; on the contrary, in the case in which the tool was previously used many times onto old and usually deformed steel wheel rim, its groove or slot surface could be deeply scratched which result in the formation of portions in relief, possible debris and/or dust that will scratch the paint on the wheel rim made of light alloy in future maintenance operations. For this reason, the choice of the tool material is normally the result of a compromise of a number of various requirements none of which is fully fulfilled.

In order to overcome these drawbacks, as it is known, it has already been proposed to provide the tire assembling-disassembling machines with two interchangeable tools, one made of plastic material suitable for light alloy wheel rims and the other made of metal alloy suitable for steel wheel rims. Nevertheless, although versatility of the tire assembling-disassembling machines is increased, the operator still has to face the inconvenience of selecting a suitable tool each time.

SUMMARY OF THE INVENTION

The main object of the present invention is to provide a protection device for a tool in a tire assembling-disassembling machine, which can be quickly and easy applied and removed.

Another object of the present invention is to provide a protection device of universal use, i.e. suitable for being applied to any type of wheel rim, i.e. designed to protect both the tool, whose useful life is thus extended, and wheel rim in tire assembling-disassembling operations.

A further object of the present invention is to provide a protection device that can be manufactured at low production costs.

These and other object that will better appear below are achieved by a protection device according the present invention for a tool in a tire assembling-disassembling machine, which tool has at least one working slot or groove designed to slidingly engage, in use, with a peripheral edge of a wheel rim located on said tire assembling-disassembling machine, characterized in that it comprises a laminar body member designed to be seated into and coat at least one portion of said working groove, and retaining means between said laminar body member and said tool arranged to removably keeping in position said laminar body member in said working groove.

Further features and advantages of a protection device in a tire assembling-disassembling machine tool according to the present invention will better appear from the following detailed description of some presently preferred embodiments thereof, given by way of non-limiting examples of how to carry out the invention, with reference to the accompanying drawings.

BRIEF DESCRIPTION OF THE DRAWINGS

In the accompanying drawings the same or similar parts or components are indicated with the same reference numerals.

DETAILED DESCRIPTION OF THE INVENTION

Figure 4:
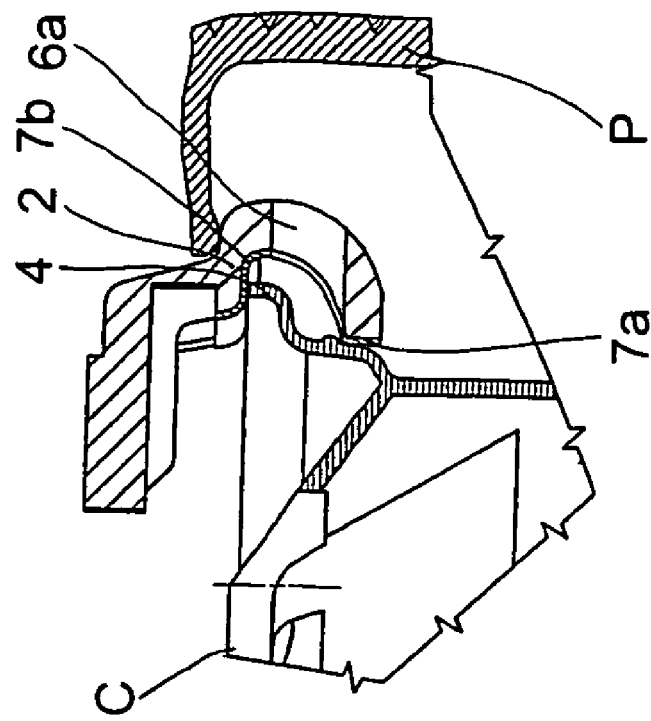
FIG. 4 shows a partial cross-section view of a tool provided with a tool protection device according to the present invention engaging with a wheel rim of a tired wheel.
Figure 1:
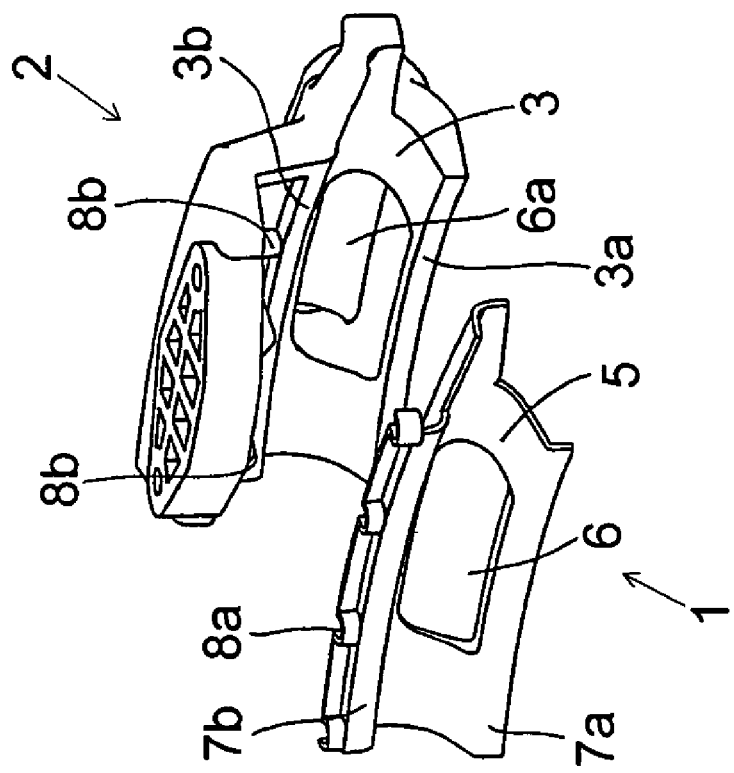
FIG. 1 illustrates an exploded perspective view of a tool provided with a protection device according to the present invention for a tire assembling-disassembling machine.
Figure 3:
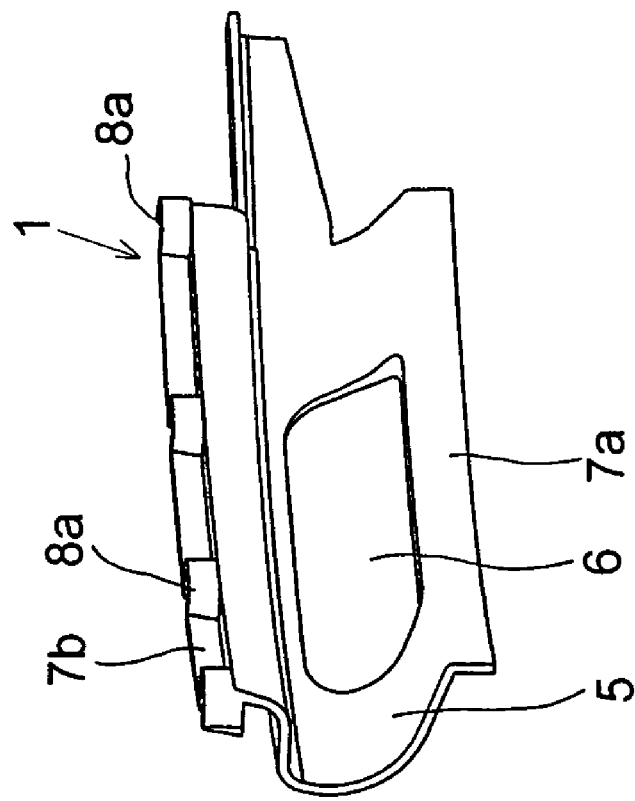
FIG. 3 is a rear perspective view of the protection device in FIG. 2.
Figure 2:
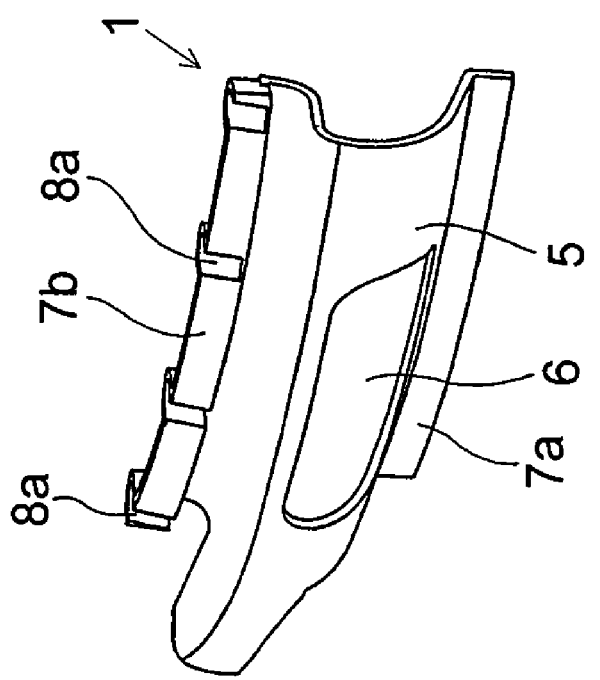
FIG. 2 shows a rear perspective view of the protection device in FIG. 1 according to the present invention.

With reference to the above Figures, it will be noted that a protection device according to the present invention for a tool 2 of a tire assembling-disassembling machine is obtained from a laminar body 1 of a suitable material, preferably pre-shaped or formed to match a working slot or groove 3 in the tool 2. In use, the slot 3 is designed to engage with a peripheral edge 4 of a wheel rim C of a tire P.

More precisely, the protection device is obtained from a pre-shaped laminar body 1 having a central convex zone or band 5 designed to cover or coat, in use, the surface of the working slot or groove 3 of the tool 2 to protect both the working groove 3 and the peripheral edge 4 of the wheel rim C from any damages being caused during sliding of the peripheral edge 4 into the working groove 3. Roughly at the center line of the convex zone 5 a through opening 6 is formed which, in use, is designed to be positioned at a respective through port 6a obtained in the tool 2, thereby providing a blank area both in the working groove 3 and in the laminar body 1 to reduce the contact surface, that, in use, will be in sliding engagement with the edge 4 of the wheel rim C.

Above and underneath the convex zone or band 5, the laminar body 1 has curved peripheral zones or bands 7a and 7b, respectively, which extend throughout the same radius of curvature, which is substantially similar to that of the working groove 3, and are designed to overlap, in use, respective edges 3b and 3a of the working groove or slot 3.

At the upper peripheral band 7b or on both the peripheral bands 7b and 7a of the protection device, a sequence of relieves or recesses 8a are formed, which are suitable for engaging with a respective recess or relief 8b provided at the respective edge or edges 3b, 3a of the working groove 3, thereby providing, in use, a male-female or shape-matching engagement suitable for providing a solid retaining means for the laminar body 1 against entrainment forces generated owing to the rotation of the wheel rim C with respect to the tool 2.

Mounting of the protection device into tool 2 in the tire assembling-disassembling machine is made by simple abutment or resilient deformation of laminar body material. In practice, once the concave zone or band 5 of the protection device has been loaded onto the working groove or slot 3 of the tool 2, the operator exerts a slight pressure onto the lower and upper bands 7a and 7b in order to push them forward towards respective edges of the working slot 3, whereby forcing the concave band 5 to match, likewise a protection coating, the surface of the working slot 3. In this manner, the laminar body 1 remains removably engaged and held in position in the tool 2.

Advantageously, the laminar body 1 can be made of a relatively soft plastic material, preferably to be used with alloy wheel rims, or of a metal material or metal alloy for use with steel wheel rims. With metal alloy wheel rims, the laminar body 1 will be selected from the group comprising: polyethylene, polypropylene, PVC, polyamide, polythene, or the like having a Shore hardness from 85 to 97, preferably from 92 to 95, whereas with steel wheel rims the laminar body 1 will preferably be made of stainless steel X5CRNi18/10 UNI EN188/2 or AISI 308,310, having a Rockwell hardness from 28 to 32 HRC.

More particularly, the material which the protection device is made of will vary depending upon the features of the material of the wheel rim C against which tool 2 is designed to act. Thus, should the wheel rim C be made of painted light alloy, laminar bodies 1 will be used made of a soft material such as a soft plastic material, which does not produce scratches or engravings in the edge 4 of the wheel rim C, upon slidingly engaging with the working groove or slot 3, whereas for steel wheel rims hard materials, such as steel, will be used. Obviously, a laminar body of plastic material will have a service life much shorter than that of a steel laminar body, which then will be used for several tired wheels.

The above described protection device is susceptible to numerous modifications and variations within the scope as defined by the claims.

Thus, for example, a not-shaped laminar body 1 can also be employed. In this case, retaining means will be provided, e.g. comprising a suitable number of through openings or slots in the laminar body 1 and a corresponding number of hooking or engaging members for engagement with the openings or slots in the tool 2. The laminar body 1 will completely match the shape of the working groove or slot 3 when tool 2 is brought to abut against the edge of the wheel rim C and is used for the first time in an assembling or disassembling operation of a tire P.

The invention claimed is:

1. A protection device for a tool in a tire assembling-disassembling machine, said tool comprising at least one working slot or groove designed to slidingly engage, in use, with a peripheral edge of a wheel rim located on said tire assembling-disassembling machine, a laminar body member designed to be seated into and coat at least one portion of said working groove, and retaining mechanism between said laminar body member and said tool arranged to removably keeping in position said laminar body member in said working groove.

2. A device as claimed in claim 1, wherein said laminar body comprises at least one through light designed to be located at a respective recess in said working groove.

3. A device as claimed in claim 1, wherein said laminar body comprises a relatively soft plastic material with a Shore hardness from 85 to 97.

4. A device as claimed in claim 3, wherein said plastic material is selected from the group comprising polypropylene, polyethylene, PVC, polyamide, or polythene.

5. A device as claimed in claim 1, wherein said laminar body comprises a relatively hard metal material having a Rockwell hardness from 28 to 32 HRC.

6. A device as claimed in claim 5, wherein said metal material comprises steel.

7. A protection device as claimed in claim 1, wherein said retaining mechanism comprises shape-matching mechanism between laminar body and said tool.

8. A protection device as claimed in claim 7, wherein said retaining mechanism comprises a plurality of relieves or recesses in said laminar body and recesses or relieves, respectively, in said tool.

9. A protection device as claimed in claim 7, wherein said retaining mechanism comprises a plurality of openings in said laminar body and a respective engaging member on said tool.

* * * * *